United States Patent [19]

Hirose

[11] Patent Number: 5,448,434
[45] Date of Patent: Sep. 5, 1995

[54] SHUTTER OPENING DEVICE
[75] Inventor: Kenji Hirose, Narashino, Japan
[73] Assignee: Canon Kabushiki Kaisha, Tokyo, Japan
[21] Appl. No.: 195,060
[22] Filed: Feb. 14, 1994

Related U.S. Application Data

[63] Continuation of Ser. No. 763,250, Sep. 20, 1991, abandoned.

[30] Foreign Application Priority Data

Sep. 28, 1990 [JP] Japan .................. 2-262439

[51] Int. Cl.⁶ .................................. G11B 3/70
[52] U.S. Cl. ........................ 360/99.01; 369/77.1
[58] Field of Search ............ 369/77.1, 77.2, 99.01, 369/99.02, 99.03, 99.06

[56] References Cited

U.S. PATENT DOCUMENTS

| 4,747,001 | 5/1988 | Kokubo et al. | 360/99.03 |
| 4,811,137 | 3/1989 | Muto et al. | 369/77.2 |
| 4,899,238 | 2/1990 | Inoue et al. | 360/99.06 |
| 5,124,975 | 6/1992 | Naoki et al. | 360/99.06 |
| 5,229,900 | 7/1993 | Arai et al. | 369/99.06 |

FOREIGN PATENT DOCUMENTS 62-22265 1/1987 Japan .

Primary Examiner—Paul M. Dzierzynski
Assistant Examiner—Don Wong
Attorney, Agent, or Firm—Fitzpatrick, Cella, Harper & Scinto

[57] ABSTRACT

A shutter opening device for opening a shutter of a cartridge when the cartridge is loaded into an information processing apparatus such as a magneto-optical recording/reproducing apparatus has an engagement mechanism which is adapted to engage with a portion of the shutter when the cartridge is inserted. The engagement mechanism causes the shutter to be in an open state during the course of loading of the cartridge. The engagement mechanism is movable with the cartridge in the loading operation while the open state of the shutter is maintained until the completion of the loading to avoid any interference of the shutter with a magnetic field application device.

6 Claims, 9 Drawing Sheets

SHUTTER OPENING DEVICE

This is a continuation of application Ser. No. 07/763,250 filed Sep. 20, 1991, abandoned.

BACKGROUND OF THE INVENTION

1. Field of the Invention

The present invention relates to a shutter opening device for opening a shutter of a cartridge, and more particularly to a shutter opening device which is suitable for use in a magneto-optical disk drive.

2. Related Background Art

FIG. 1 shows a conventional cartridge of a magneto-optical disk. In the figure, numeral 1 denotes a disk-shaped recording medium, and numeral 2 denotes a cartridge for accommodating the medium. A shutter 3 is slidably supported in a direction A. The shutter 3 is imparted with a restoring force by a spring 5. In a non-use mode of the cartridge, the shutter is kept closed to prevent foreign materials such as dust from entering. FIG. 2 shows an open position of the shutter of the cartridge of FIG. 1. An engagement member 6 for transmitting a shutter open/close force to the shutter 3 is fixed so that the shutter is opened by pushing a side 7 of the engagement member 6.

A shutter opening device for such a cartridge of the magneto-optical disk as shown in FIG. 3 has been known in the art.

An operation of the shutter opening device shown in FIG. 3 is explained below. When the cartridge 2 is inserted toward a direction B which is a drive direction, an open/close member 8 engages with the side 7 of the engagement member 6 so that the engagement member 6 is slid in the direction A. In order to attain the sliding, pins 9 and 10 are provided under the open/close member 8. The pins 9 and 10 are guided by guide grooves 12 and 13, respectively, formed in a guide plate 11, and as the cartridge 2 moves in the direction B, the engagement member 6 receives a force on the side 7 thereof so that the shutter is opened.

Anti-escape members 14 and 15 are fitted to the pins 9 and 10 to prevent the pins 9 and 10 from moving away from the guide grooves, and one end of a spring 16 is fixed to the pin 9 and the other end thereof is fixed to the guide plate 11 so that the open/close member 8 is restored to the original position when the cartridge is removed.

Numeral 17 denotes a turn table for rotating the disk-shaped recording medium 1, numeral 18 denotes an optical pickup, and numeral 19 denotes a magnetic field application device provided on the guide plate 11.

In the above prior art device, however, since the shutter 3 is not completely opened until the movement of the cartridge 2 in the direction B essentially terminates, it is necessary to retract the magnetic field application device 19 (which is positioned in the vicinity of the recording medium with a smaller spacing thereto than an interval between the recording medium and the shutter in order to converge the magnetic field to the recording medium when performing recording, reproducing and erasing operations) upward until the loading of the cartridge 2 is completed in order to avoid an interference between the magnetic field application device 19 and the shutter 3. To this end, a retraction mechanism and a space therefor are required, which results in an increase of size and weight, a reduction of a response speed and a increase in cost.

In light of the above, a shutter open/close device of a cartridge which permits the loading of the cartridge 2 while the magnetic field application device 19 is stationary, that is, which creates no interference between the magnetic field application device and the shutter has been sought.

SUMMARY OF THE INVENTION

It is an object of the present invention to provide a shutter open/close device which permits the loading of a cartridge while a magnetic field application device is stationary, that is, which creates no interference between the magnetic field application device and the shutter.

The above object is attained in a shutter opening device for opening/closing the shutter provided in the cartridge when the cartridge is loaded to an information processing unit so as to effect at least one of recording of information, reproduction of information and erasing of information on or from a recording medium accommodated in the cartridge, by providing an engagement member which engages with a portion of the shutter when the cartridge is loaded, and in connection with the loading, opens the shutter to a predetermined open state in the course of the loading of the cartridge and then moves with the cartridge in the loading direction until completion of the loading while the above open state is maintained.

The above object is further attained in a magneto-optical recording and reproducing apparatus for effecting at least one of recording of information, reproduction of information and erasing of information by irradiating a light beam to a recording medium accommodated in a cartridge under the application of a magnetic field and having a shutter opening device for opening a sliding shutter of the cartridge when the cartridge is inserted, by providing a holder for receiving the cartridge loaded to the apparatus, magnetic field application means provided in the holder for applying the magnetic field, and an engagement member for bringing the shutter to a predetermined open state in the course of the loading in response to the loading in order to avoid an interference with the magnetic field application means and movable with the cartridge in the loading direction after the predetermined open state is attained and until the loading of the cartridge into the holder is completed while the predetermined open state is kept.

DETAILED DESCRIPTION OF THE PREFERRED EMBODIMENTS

Figure 1:
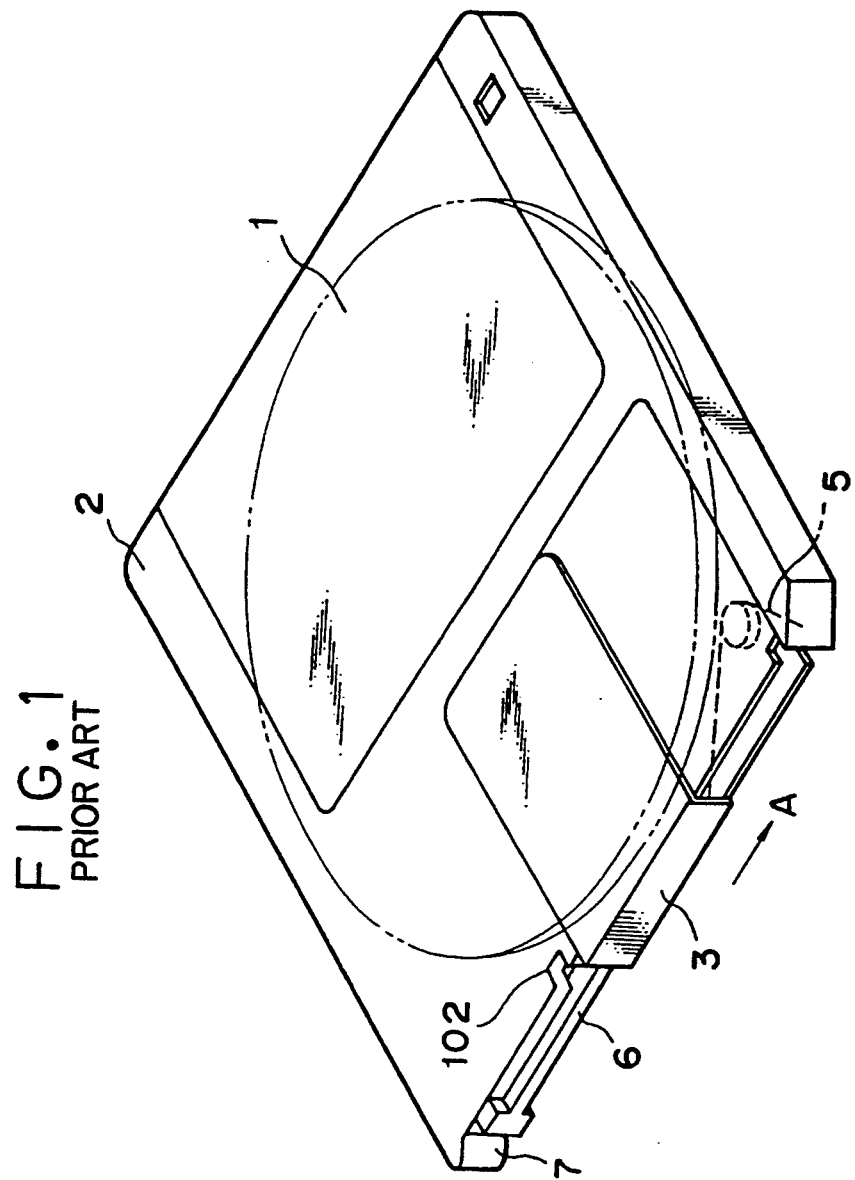
FIG. 1 shows a perspective view of a shutter of a cartridge in a closed position.
Figure 2:
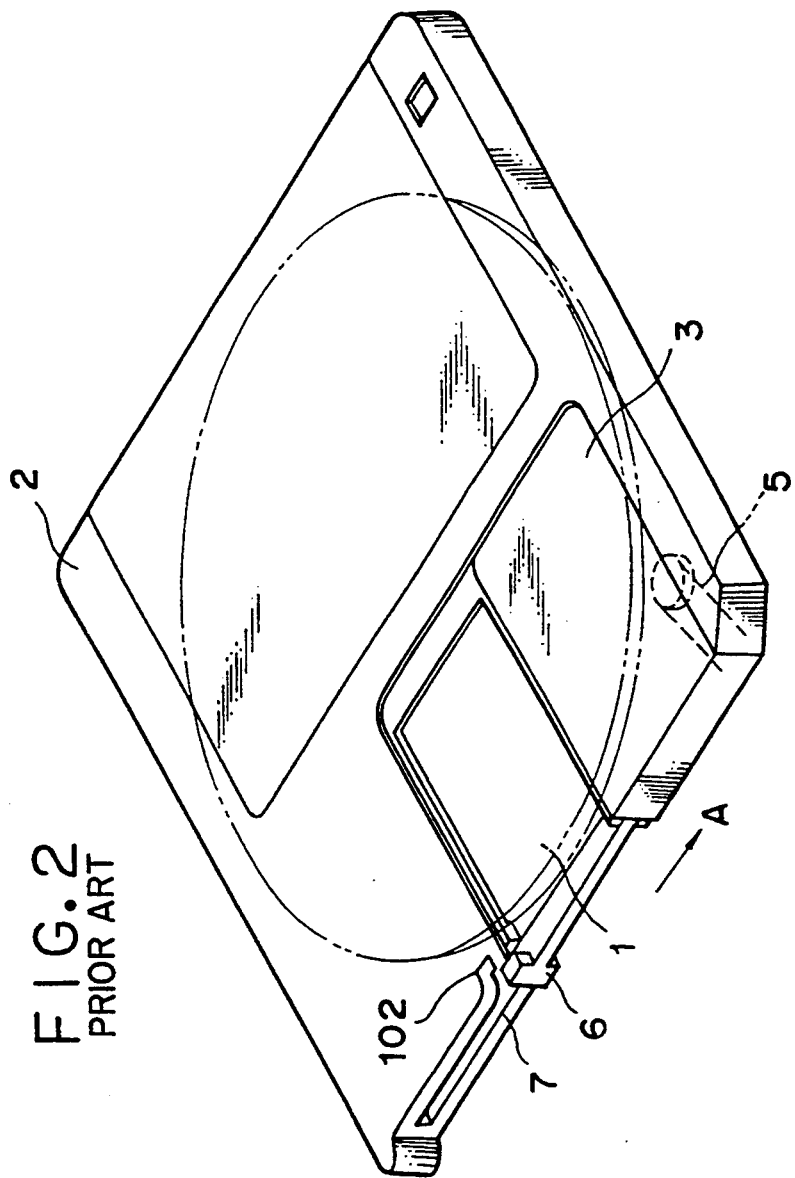
FIG. 2 shows a perspective view of the shutter of the cartridge in an open position.
Figure 3:
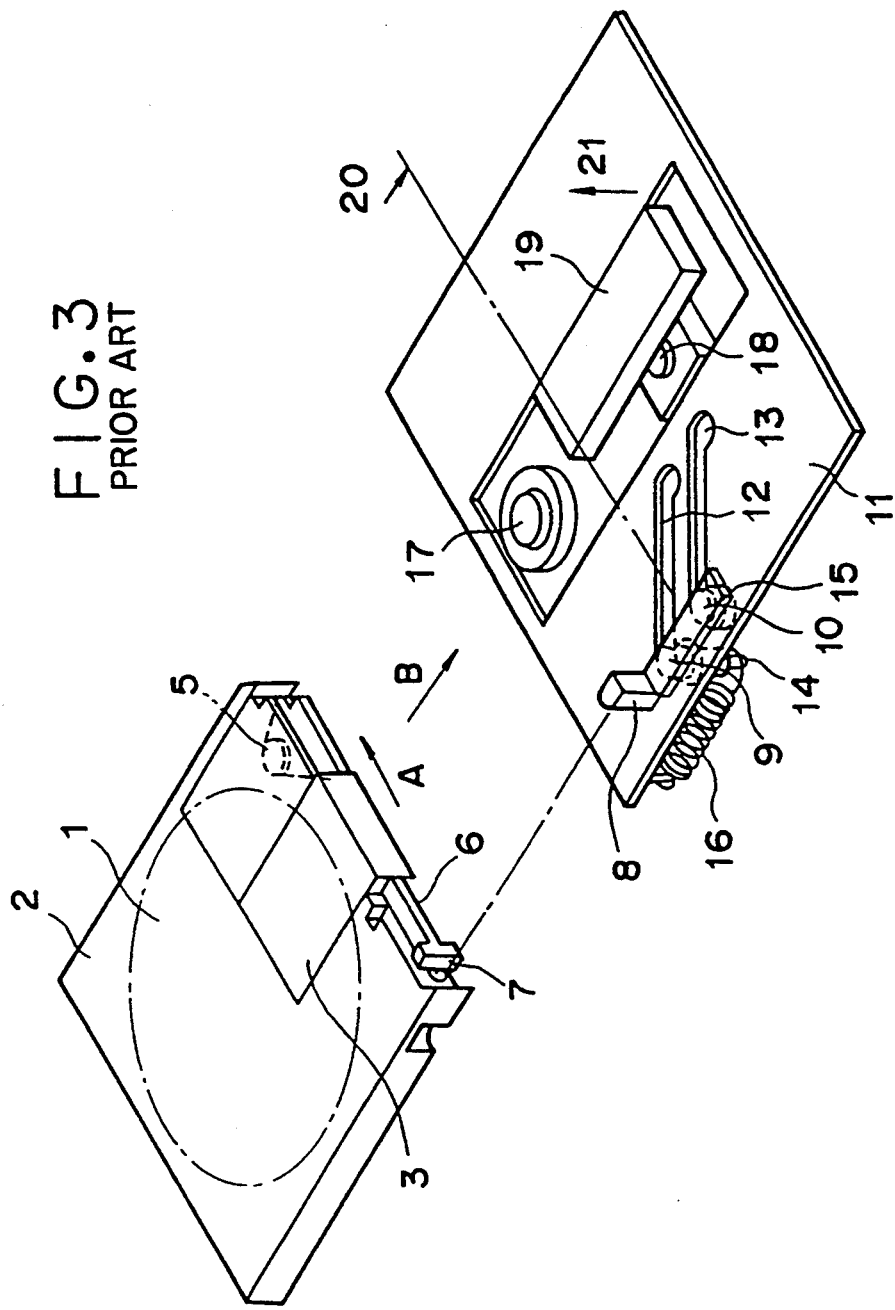
FIG. 3 shows a prior art shutter opening device.
Figure 4:
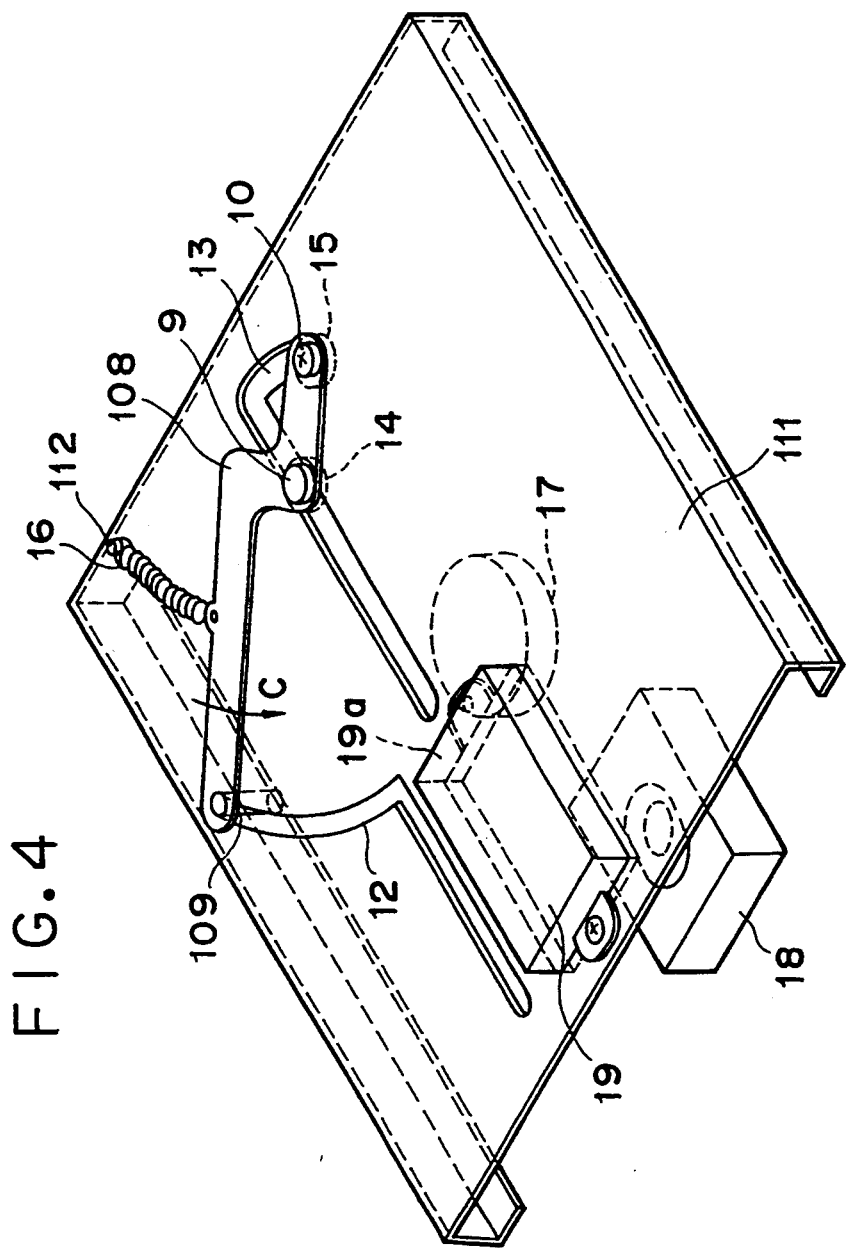
FIG. 4 shows a perspective view of a shutter opening device which is a first embodiment of the present invention.

FIG. 4 shows a perspective view of a first embodiment of the present invention. In the figure, the like elements to those of the prior art device are designated by the like numerals and the explanation thereof is omitted. In the figure, numeral 108 denotes an arm for opening and closing a shutter, and a shutter open/close pin 109 which engages with a side 7 of an engagement member 6 of the cartridge and pins 9 and 10 are fixed thereto. Numeral 111 denotes a cartridge holder which receives the cartridge loaded into a magneto-optical information recording and reproducing apparatus. A passage groove 12 for the shutter open/close pin 109 and a guide groove 13 for the pins 9 and 10 are formed in an upper surface of the cartridge holder 111. The guide groove 13 is adapted to engage with the pins 9 and 10.

The guide groove 12 comprises a linear portion and a curved portion. The linear portion is formed in parallel to the inserting and ejecting directions of the cartridge, and a rear end of the groove as viewed in the inserting direction is formed behind a front end surface 19a of a magnetic field application device 19 as viewed in the inserting direction. The curved portion connects to the rear end of the linear portion and a chord connecting the ends of the curved portion makes a predetermined angle smaller than 90 degrees to the inserting and ejecting directions so that a force in the inserting and ejecting direction applied to the shutter open/close pin 109 inserted into the guide groove 12 is translated to a force to open and close the shutter. The above angle of the curved portion is set such that the shutter of the cartridge is fully opened after the inserting of the cartridge into the holder 111 and before the cartridge reaches a position of a front end 192 of the magnetic field application device 19. The curved portion may be linear so long as the same effect is attained.

In the present embodiment, the guide groove is formed in the holder 111 although the guide groove may be formed in a separate member. Anti-escape members 14 and 15 are mounted on the pins 9 and 10 so that the arm 108 is movably held by the holder 111. One end of a spring 16 is fixed to the arm 108 and the other end of the spring 16 is fixed to a projection 112 of the holder 111 so that the arm is held at the position shown in FIG. 4 when the cartridge is not loaded. Numeral 17 denotes a turn table for rotating the disk-shaped recording medium 1, numeral 18 denotes an optical pickup for reading and writing information, and numeral 19 denotes a magnetic field application device which is directly fixed to the holder 111.

Figure 5:
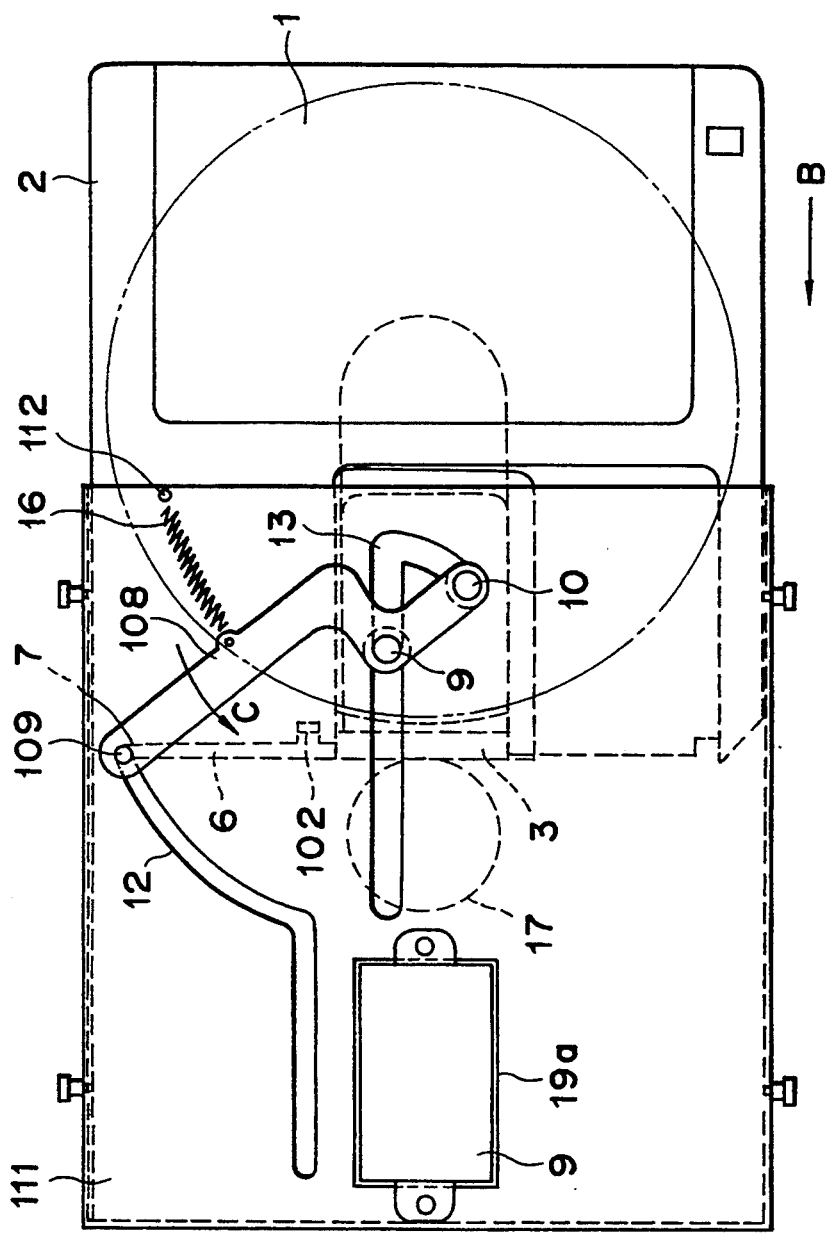
FIG. 5 shows a plan view of the first embodiment in a first loading stage of a cartridge.
Figure 6:
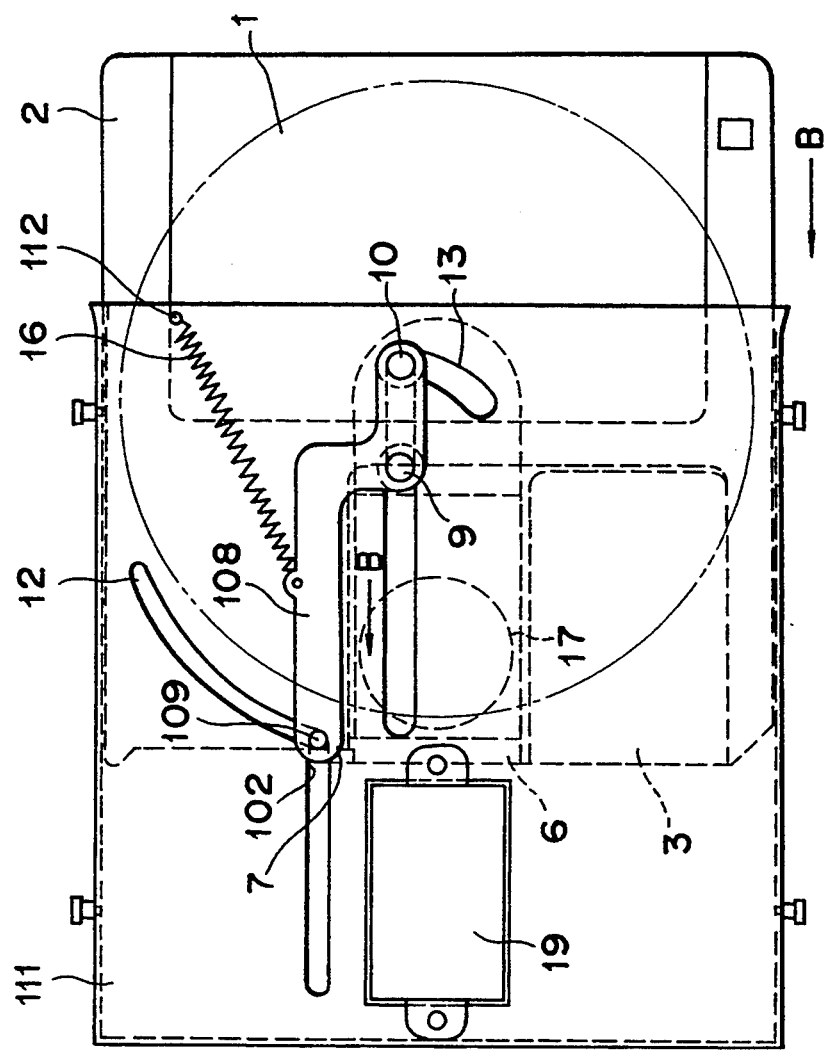
FIG. 6 shows a plan view of the first embodiment in a second loading state of the cartridge.
Figure 7:
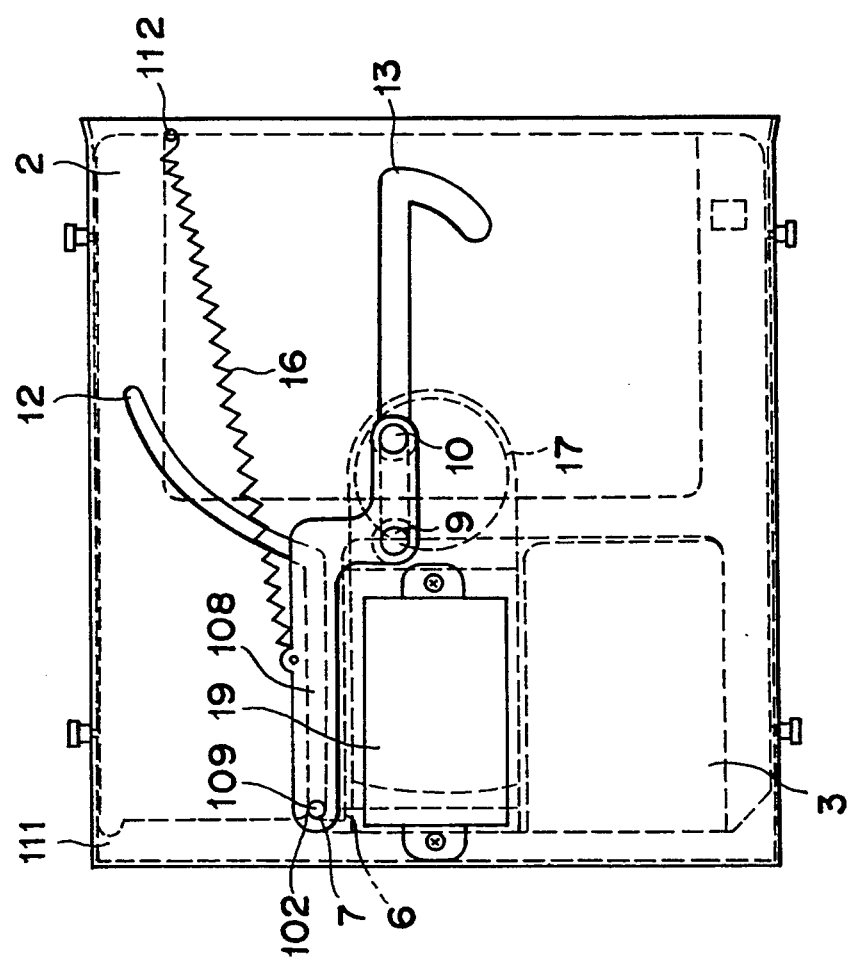
FIG. 7 shows a plan view of the first embodiment at the completion of the loading of the cartridge.

FIGS. 5 to 7 show plan views of the embodiment of FIG. 4 as viewed from the top and they show stages of movement of the cartridge and the arm operation. The operation of the present embodiment is described in detail with reference to FIGS. 5 to 7.

When the cartridge 2 is loaded into the magneto-optical information recording and reproducing apparatus, it is inserted into the cartridge holder 111 and the shutter open/close pin 109 engages with the engagement member 6 at the position of FIG. 5. When the cartridge is further inserted, the shutter open/close pin 109 is urged in the direction B by an inserting force and it is moved along the guide groove 12. The force also acts to rotate the arm 108 around the pin 9 in a direction C so that the pin 10 is moved along the guide groove 13. As the cartridge is further inserted, the shutter open/close pin 109 is also moved along the guide groove 12 while it engages with the engagement member 6. As a result, the shutter 3 is gradually opened. When the cartridge 2 is inserted to the position shown in FIG. 6, the shutter 3 is fully opened and the rotation of the arm 108 is terminated and the pin 109 fits to a notch 102 of the cartridge 2. In this manner, the shutter 3 is fully opened before the cartridge 2 reaches the magnetic field application device 19. When the cartridge 2 is further pushed in, the arm 108 is guided by the linear portion of the guide groove 12 which is parallel to the inserting and ejecting directions while the pins 9 and 10 are guided by the linear portion of the guide groove 13 which is again parallel to the inserting and ejecting directions, so that they move with the cartridge in parallel to the inserting direction B of the cartridge. The cartridge 2 reaches a final position as shown in FIG. 7.

Then, the holder 111 is moved downward by a loading mechanism (not shown) together with the shutter opening device and the magnetic field application device, and the disk-shaped recording medium 1 in the cartridge 2 is loaded to the turn table 17.

When the cartridge is ejected, the holder 111 is moved upward by an unloading mechanism (not shown), and the arm 108 and the cartridge 2 are returned to the position of FIG. 6 by the biasing force of the spring 16. Then, as the cartridge is manually taken off, the shutter open/close pin 109 of the arm 108 escapes from the notch 102 of the cartridge so that the arm 108 is rotated to the position of FIG. 5 by the spring 16.

In the present embodiment, the arm or the shutter open/close pin 109 makes both the rotational movement and the linear movement to open the shutter of the cartridge at the early stage (before the cartridge reaches the magnetic field application device in the inserting direction) and to permit the inserting to the final position while the open state is kept. Thus, even when the magnetic field application device is fixed, the interference with the shutter is prevented and the simplification of the drive, the reduction of size and weight, the enhancement of response and the reduction of cost are attained.

Figure 8:
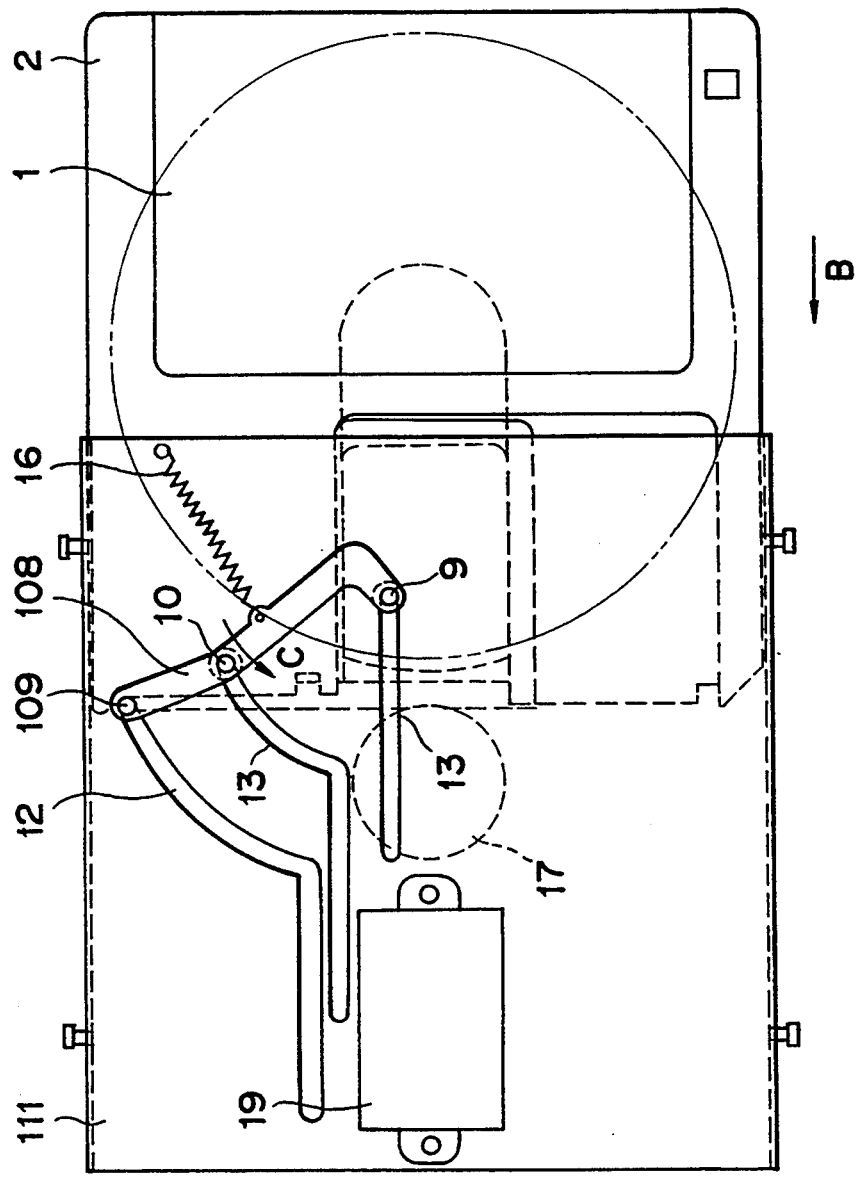
FIG. 8 shows a plan view of a second embodiment of the present invention.

Another embodiment of the present invention is now explained. FIG. 8 shows a plan view of the other embodiment. The like numerals to those shown in the previous embodiment are designated by the like numerals. In the present embodiment, two guide grooves 13 which engage with the pins 9 and 10 of the arm 108 to rotate and linearly move the arm are provided. The pin 10 is guided by the guide groove 13 and rotated around the pin 9 to open the shutter. Then, the pins 9 and 10 are guided by the two guide grooves 13 and linearly moved in the direction B so that the loading of the cartridge is completed while the shutter 3 is opened. When the cartridge is ejected, the operation is reversed.

By providing a plurality of guide grooves in the present embodiment, a freedom in constructing the mechanism increases and the assembling is facilitated.

Figure 9:
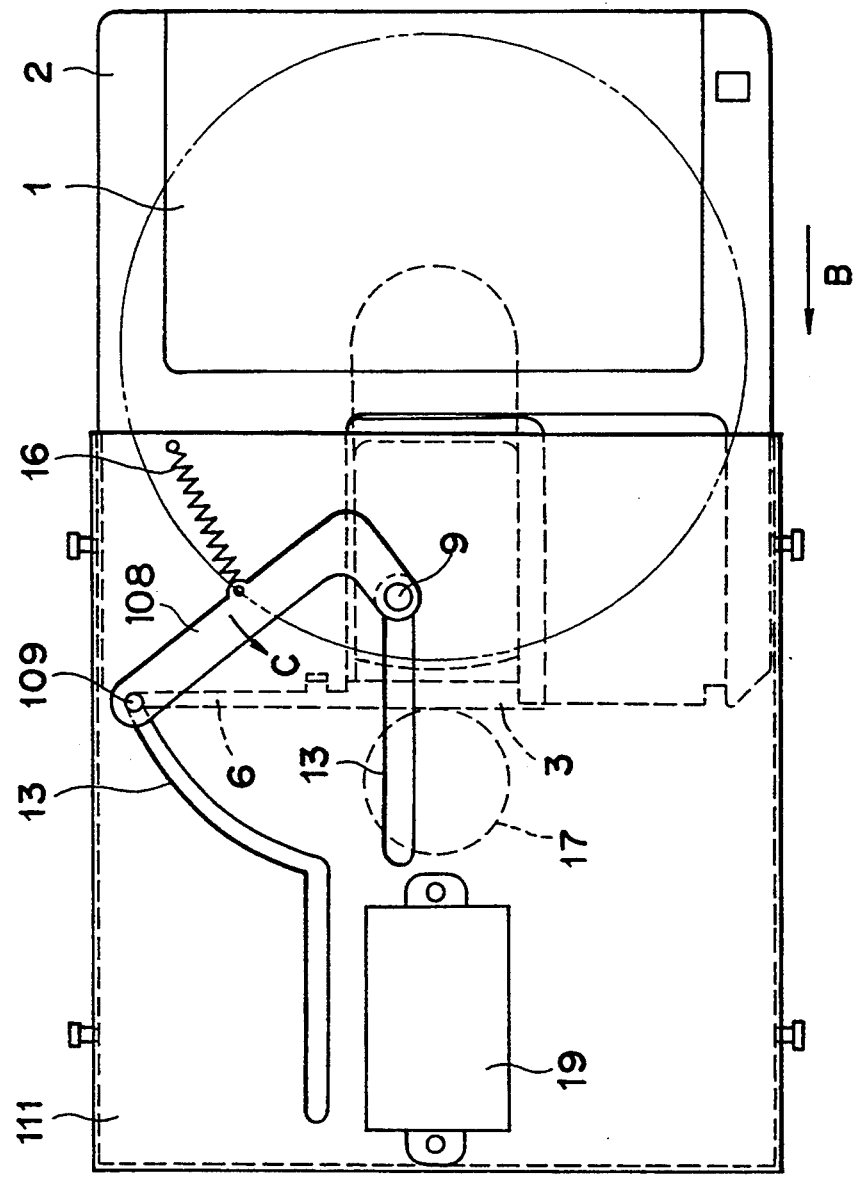
FIG. 9 shows a plan view of a third embodiment of the present invention.

A further embodiment of the present invention is now explained. FIG. 9 shows a plan view of the further embodiment. In FIG. 9, the like numerals to those shown in the previous embodiment denote the like elements. In the present embodiment, the guide groove 13 for guiding the shutter open/close pin 109 of the arm 108 is provided, and the shutter open/close pin 109 is guided by the guide groove 13 and rotated to open the shutter 3. When the shutter 3 is fully opened, the arm 108 is linearly moved in the direction B and the loading of the cartridge is completed.

In the present embodiment, the shutter open/close pin 109 is engaged with the guide groove 13 so that it is guided for the rotational and linear movements. Thus, the number of pins required is reduced by one.

As described above, the engagement member for opening and closing the shutter is linearly moved with the cartridge in the inserting and ejecting direction while the shutter open/close movement and the shutter open state are fixed. As a result, the shutter can be opened at the early stage when the cartridge is inserted and the interference between the magnetic field application device and the shutter of the cartridge is avoided. Thus, the magnetic field application device may be fixed and the size and weight of the overall drive are reduced, the response is improved and the cost is reduced.

What is claimed is:

1. A shutter opening mechanism for opening a sliding shutter provided on a cartridge containing a recording medium when the cartridge is inserted into a cartridge holder of a recording and reproducing apparatus in which at least one of recording of information and reproduction of information is effected on the recording medium, said mechanism comprising:
    a pivotable lever member pivotably supported by the cartridge holder;
    an engagement member, supported by said lever member near an end of said lever member and positioned near a side of the cartridge holder in a direction perpendicular to a cartridge insertion direction, which engages a portion of the sliding shutter when the cartridge is inserted into the cartridge holder; and
    a pivot axis member of said lever member supported by the cartridge holder, which is positioned between said engagement member and a central portion of the cartridge holder in the direction perpendicular to the cartridge insertion direction and which is positioned nearer than said engagement member to a side of the cartridge holder at which the cartridge is inserted, said pivot axis member being movable along the cartridge insertion direction on the cartridge holder,
    wherein, during insertion of the cartridge into the cartridge holder, said engagement member engages the portion of the sliding shutter, a force of the cartridge against said engagement member causes said lever member to pivot about said pivot axis member, and, after said lever member pivots an amount necessary to completely open the sliding shutter, said pivot axis member, said lever member, and said engagement member move in the cartridge insertion direction.

2. A mechanism according to claim 1, wherein the recording medium comprises a magneto-optical recording medium.

3. A mechanism according to claim 2, wherein the recording and reproducing apparatus performs at least one of recording of information and reproduction of information on the magneto-optical recording medium by irradiating the medium with a light beam while applying a bias magnetic field to the recording medium using bias magnetic field applying means.

4. A recording and reproducing apparatus which effects at least one of recording, reproduction, and erasure of information on a recording medium accommodated in a cartridge and which has a shutter opening mechanism for opening a sliding shutter provided on the cartridge when the cartridge is inserted into said apparatus, said apparatus comprising:
    a cartridge holder for accommodating the cartridge;
    a pivotable lever member pivotably supported by the cartridge holder;
    an engagement member, supported by said lever member near an end of said lever member and positioned near a side of said cartridge holder in a direction perpendicular to a cartridge insertion direction, which engages a portion of the sliding shutter when the cartridge is inserted into said cartridge holder; and
    a pivot axis member of said lever member supported by said cartridge holder, which is positioned between said engagement member and a central portion of the cartridge holder in the direction perpendicular to the cartridge insertion direction and which is positioned nearer than said engagement member to a side of the cartridge holder at which the cartridge is inserted, said pivot axis member being movable along the cartridge insertion direction on the cartridge holder,
    wherein, during insertion of the cartridge into said cartridge holder, said engagement member engages the portion of the sliding shutter, the force of the cartridge against said engagement member causes said lever member to pivot about said pivot axis member, and, after said lever member pivots an amount necessary to completely open the sliding shutter, said pivot axis member, said lever member, and said engagement member move in the cartridge insertion direction.

5. An apparatus according to claim 4, wherein said apparatus comprises a magneto-optical recording apparatus which effects at least one of recording, reproduction, and erasure of information on a recording medium accommodated in a cartridge by irradiating the recording medium with a light beam while applying a bias magnetic field.

6. An apparatus according to claim 5, further comprising magnetic field application means provided in said holder for applying the bias magnetic field.

* * * * *